United States Patent Office 3,001,907
Patented Sept. 26, 1961

3,001,907
MANUFACTURE OF FIRE-RETARDANT BOARD
Frederick S. Bergstrom, Cloquet, Minn., assignor to Wood Conversion Company, St. Paul, Minn., a corporation of Delaware
No Drawing. Filed Nov. 17, 1958, Ser. No. 774,134
6 Claims. (Cl. 162—175)

The present invention relates generally to rigid fiber board such that on subjection to fire the physical form remains.

Vermiculite in expanded form is an excellent insulating material and therefore desirable as the content of thermal insulating board. However, to make such a board, other material must be incorporated to give structural strength to the board, without loss of the insulating properties of the vermiculite. Vegetable fibers may be incorporated with the vermiculite in proportion to accomplish these objectives, but when such a board is subjected to fire, thereby burning out the organic fibers, the vermiculite residue crumbles away. As a consequence, such a board fails as a fire partition.

It is the object of the present invention to form a board of vermiculite and vegetable fibers which may be used as a fire partition or barrier without crumbling as a result of subjection to fire.

The invention is based on the discovery that when bentonite clay is also incorporated into such a board, the clay functions to hold the vermiculite particles together against crumbling when the organic content is destroyed by heat from a fire.

Bentonite is the name of a family of clays of which the chief and active component is montmorillonite. The remaining mineral is grit and may be one or more of feldspar, gypsum, calcium carbonate, quartz and numerous others.

Montmorillonite is colloidal in nature and when dispersed in water it may be precipitated or coagulated by precipitants, such as acids and alum. In the present invention, the clay is more efficiently used in a board-forming furnish by dispersing it and then coagulating it in the furnish to be dewatered. Whether or not it is precipitated in the presence of one or both of the vermiculite particles and the vegetable fibers is immaterial; and it is likewise not necessary that it be coagulated or precipitated from the water vehicle containing it. Since the grit has no function in the present invention, the active agent is referred to hereinafter as colloidal clay.

In carrying out the invention, approximately three parts of expanded vermiculite in fine particle form are used to about 1 part of vegetable fiber. The fiber is used to provide reinforcing strands to give strength to an otherwise granular mass of low strength. As bond between the granules and fibers, any suitable adhesive may be used. The vegetable fibers may be hydrated to effect the paper-maker's bond, but it is more economic and easier in control to add an adhesive, such as starch. Tapioca starch grains are preferred, because they gelatinize in situ at a suitably low temperature in drying the board to be formed. In using the paper-maker's bond, the gelatinous character of the fibers makes the furnish slower in dewatering on a Fourdrinier machine, so by using the starch in non-gelatinous form of natural grains, the speed of formation may be increased.

The vermiculite, fibers, starch and colloidal clay are mixed together in water as a furnish to be dewatered in any conventional filtering apparatus, such as a Fourdrinier machine, which leaves a mat of uniform thickness to be pressed and dried. Preferably, the clay is allowed to stand in the water or in the furnish until it becomes colloidally distributed and intimately associated with the vermiculite. With the colloidalized clay thus well distributed throughout the furnish it is then desirable to coagulate the clay as by adding a precipitant such as alum, or an acid, thus to improve retention of the clay on filtering.

The fiber used is preferably a cellulosic one, such as cotton, chemical cellulose, semi-chemical cellulose, ground-wood, or a mixture. Waste newsprint is a suitable mixture, after it has been pulped in water to liberate the individual fibers.

A suitable formulation for a furnish is:

Table I

| | Parts by weight |
|---|---|
| Expanded vermiculite | 75 |
| Newsprint | 25 |
| Tapioca starch grains | 10 |
| Bentonite clay | 10 |
| Alum | 1 |
| Water | 3900 to 6600 |

The amount of water is immaterial, serving only as a vehicle to aid in forming a mat by dewatering. The mat dewatered by drainage, with or without suction, is further dewatered by pressing, the degree being controlled so that on drying the resulting wet mat with heat, either with or without pressure or restraint, the dry board has a density of about 17 pounds per cu. ft. This density is not critical for the invention, but is conventional density for thermal insulation board.

In drying, the board passes through an oven and attains a temperature above the boiling point of water, thus removing all the free water quickly. In doing this, the starch grains burst in situ when their temperature reaches about 140° F. This takes place while an adequate content of water is present to disperse the resulting colloidalized starch as binder to new locations removed from the locus of each unburst grain.

The following examples show some variations in procedure and in the formula of Table I, and the data are combined in Table II.

*Example 1.*—Using the formula of Table I, the alum was added before the newsprint fiber, thereby to coagulate the bentonite on the vermiculite.
*Example 2.*—Alum is omitted from the formulation.
*Example 3.*—Bentonite is omitted from the formulation.
*Example 4.*—Sulfuric acid was used in place of alum.

Table II

| Example | Omitted | Stock pH | Board Properties | | | |
|---|---|---|---|---|---|---|
| | | | Thick (Inches) | Density, lbs./cu. ft. | M/R, lbs./sq. in. | Fire Test [1] |
| 1 | 0 | 4.5 | 0.503 | 17.6 | 283 | Intact. |
| 2 | Alum | 6.8 | 0.499 | 17.4 | 249 | Do. |
| 3 | Bentonite | 4.5 | 0.520 | 16.3 | 220 | Disintegrated. |
| 4 | Alum | 4.5 | 0.499 | 17.7 | 243 | Intact. |

[1] The board is placed in a horizontal plane over a Bunsen burner. The flame is gradually increased to its maximum height and played on the board for 30 minutes.

The formula given in Table I is merely illustrative, and variations may be made. The important and predominant content is vermiculite which with the vegetable fibers forms the bulk of the board. The composition may vary within the following range:

Table III

|  | Parts by Weight | |
|---|---|---|
|  | Range | Preferred |
| Vermiculite | 70 to 95 | 75 |
| Vegetable Fiber | 30 to 5 | 25 |
|  | Base=100 | |
| Starch grains | 5 to 30 | 10 |
| Colloidal clay | 10 | 10 |

Clay in amount over 10% of the base does not add to the effect, but gives slower stock. Where starch grains are used as the adhesive, the slowness of the stock is not materially altered by the amount thereof, as is the case where cooked starch sol is employed.

The invention is not to be considered as limited to or by the illustrative examples, other embodiments being contemplated as falling within the scope of the invention as set forth in the appended claims.

I claim:

1. The method of making a fire-retardant board having self-sustaining body properties when subjected to flame, comprising forming a homogeneous aqueous suspension of approximately three parts of expanded vermiculite particles to one part of cellulosic fibers, and based upon 100 parts of said two materials, ten parts of starch grains and ten parts of montmorillonite clay, dewatering said suspension and thereby forming a wet board-forming mat, and drying the wet mat to an insulating board by exposure to a temperature above the boiling point of water, whereby the starch grains are gelatinized in situ in the presence of water in the mat.

2. The method of making a fire-retardant board having self-sustaining body properties when subjected to flame, comprising forming a homogeneous aqueous suspension of 70 to 95 parts by weight of expanded vermiculite particles and from 30 to 5 parts by weight of cellulosic fibers, and based upon 100 parts of said two materials, 5 to 30 parts by weight of starch grains and about 10 parts by weight of colloidal clay predominating in montmorillonite, dewatering said suspension and thereby forming a wet board-forming mat, and drying the wet mat to an insulating board by exposure to a temperature above the boiling point of water, whereby the starch grains are gelatinized in situ in the presence of water in the mat.

3. A fire-retardant board comprising one part of cellulosic fibers interfelted in the presence of approximately three parts of expanded vermiculite particles and 0.4 part of colloidal clay predominating in montmorillonite, said materials being bonded together by starch from grains gelatinized in situ.

4. A fire-retardant board comprising cellulosic fibers interfelted and uniformly distributed with expanded vermiculite particles and colloidal clay predominating in montmorillonite, said materials being bonded together by starch from grains gelatinized in situ, said board having from 5 to 30 parts by weight of fiber to 95 to 70 parts by weight of vermiculite, and having colloidal clay in amount of about 10 parts by weight to 100 parts of vermiculite plus fiber.

5. The method of making a fire-retardant board having self-sustaining body properties when subjected to flame, comprising forming a homogeneous aqueous dispersion of 70 to 95 parts by weight of expanded vermiculite particles, from 30 to 5 parts by weight of vegetable fiber, about 10 parts of colloidal clay predominating in montmorillonite, and starch grains as a bonding agent, dewatering said suspension and thereby forming a wet board-forming mat, gelatinizing the starch grains in situ by heating the wet mat throughout to at least a gelatinizing temperature for the starch, and drying the resulting mat containing the resulting gelatinized starch as binder.

6. The method according to claim 5 in which there are 75 parts of vermiculite, 25 parts of cellulosic fiber, and about 10 parts of colloidal clay predominating in montmorillonite.

References Cited in the file of this patent

UNITED STATES PATENTS

| 2,108,761 | Becher | Feb. 15, 1938 |
| 2,705,198 | Seybold | Mar. 29, 1955 |